(12) United States Patent
Kalnischkies et al.

(10) Patent No.: US 9,501,445 B2
(45) Date of Patent: Nov. 22, 2016

(54) METHOD FOR CONFIGURING AND OPERATING A MEDICAL APPARATUS WITH ELECTRONICALLY READABLE COMPONENT DESCRIPTIONS

(71) Applicants: Bernd Kalnischkies, Erlangen (DE); Wolf Lehle, Nuremberg (DE)

(72) Inventors: Bernd Kalnischkies, Erlangen (DE); Wolf Lehle, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 625 days.

(21) Appl. No.: 13/973,338

(22) Filed: Aug. 22, 2013

(65) Prior Publication Data
US 2014/0059259 A1 Feb. 27, 2014

(30) Foreign Application Priority Data
Aug. 24, 2012 (DE) .................. 10 2012 215 110

(51) Int. Cl.
*G06F 13/42* (2006.01)
*G06F 15/177* (2006.01)

(52) U.S. Cl.
CPC .......... *G06F 13/4286* (2013.01); *G06F 15/177* (2013.01)

(58) Field of Classification Search
CPC .................. G06F 13/4286; G06F 15/177
See application file for complete search history.

(56) References Cited

U.S. PATENT DOCUMENTS

| | | | | |
|---|---|---|---|---|
| 6,581,117 B1* | 6/2003 | Klein | .................... | G06F 19/327 |
| | | | | 348/65 |
| 2009/0172223 A1* | 7/2009 | Lee | ..................... | G05B 19/054 |
| | | | | 710/104 |
| 2010/0037103 A1 | 2/2010 | Helmecke et al. | | |
| 2010/0058040 A1 | 3/2010 | Helmecke et al. | | |
| 2013/0080585 A1* | 3/2013 | Schaffner | ............... | H04L 67/10 |
| | | | | 709/217 |

OTHER PUBLICATIONS

Zitzmann et al..; "Interoperable Medical Devices Due to Standardized CANopen Interfaces"; Joint Workshop on High Confidence Medical Devices, Software, and System and Medical Device Plug-and-Play Interoperability; pp. 97-103; DOI 10.1109/HCMDSS_MDPnP.2007.38.

\* cited by examiner

*Primary Examiner* — Glenn A Auve
(74) *Attorney, Agent, or Firm* — Schiff Hardin LLP (57) ABSTRACT

In a method to operate a magnetic resonance tomography apparatus that includes a number of electronically controlled sub-components, the components and/or the apparatus are controlled by a control unit via sensors and actuators. All relevant configuration data and operating data are stored in respective electronic objects that are stored in an apparatus memory. An electronic object is respectively associated with each component.

9 Claims, 4 Drawing Sheets

METHOD FOR CONFIGURING AND OPERATING A MEDICAL APPARATUS WITH ELECTRONICALLY READABLE COMPONENT DESCRIPTIONS

BACKGROUND OF THE INVENTION

1. Field of the Invention

The present invention is in the fields of electronics, and in particular control engineering, and more particularly concerns the field of medical imaging apparatuses, for example magnetic resonance tomography systems, computed tomography systems, lithotripters, and other complex medical technology apparatuses.

2. Description of the Prior Art

Medical technology apparatuses embody a number of technical sub-systems, for example a C-arm, a patient table (controllable and movable via a corresponding motor), collimators and dose measurement systems, as well as corresponding actuators (for example to move the patient table) with corresponding position sensors (for example rotary encoders and cables).

The operation of a particular medical technology apparatus requires a number of different workflows to be executed. The individual technical sub-systems must be configured for their embedding or integration into the apparatus (as embedded systems). Furthermore, the individual control elements or actuators of the technical sub-systems must be configured and controlled accordingly. After a configuration phase, the operation of the medical technology apparatus can be started. The operating state is typically detected continuously, and monitoring of the technical sub-systems is implemented. Moreover, tests (concerning the apparatus and the technical sub-systems) can also be executed.

For both the configuration and the operation of the technical sub-systems and of the complex complete system, it is necessary that the properties of the sub-systems (also called "components" or "modules") be made known to the complete system.

Conventionally, such imparting of the component properties takes place in the form of a data sheet that is delivered by the manufacturer of the component. This data sheet is then received by the system developer and implemented in software, normally individually for each component. The data sheet can exist beforehand in various formats, for example as a design specification or Excel sheet. Some protocols (such as CANopen) also stipulate a conditional, machine-readable data sheet in a separate format. The data sheet is thereby normally not stored in the system (memory). A disadvantage of the use of such a data sheet is, that it describes only the properties of the component, for example the register assignment. The task of the system software developer is then to retrieve from this specification (and possibly in cooperation with the developer or vendor of the component) the information that is necessary in order to configure and operate the apparatus in the complete system. This process is iterative and is very susceptible to misunderstandings and errors.

SUMMARY OF THE INVENTION

An object of the present invention is to improve, automate and simplify the aforementioned known procedures. The risk of misinterpretations given a manual importation of data sheets should in particular be avoided.

In the following, the invention is described based on the method. Embodiments, alternative solutions with additional features and advantages that are mentioned are similarly applicable to the control unit, and vice versa. The respective functional features of the method are implemented by corresponding microprocessor modules that are designed to execute the respective functionality. For example, the method step "storing a data set" can be implemented via a memory that is designed to store the respective data set.

According to one aspect, the present invention relates to a computer-implemented method to operate a magnetic resonance tomography apparatus or another medical apparatus that has a number of electronically controlled components. To operate the complex apparatus, it is necessary for the individual apparatus modules or apparatus components to be initially configured and made known to the complete system. The individual components and/or the apparatus are controlled by a control unit. This takes place via sensors and actuators (control elements) that are likewise integrated into the complete system. The components are engaged in data exchange among one another and/or the apparatus and/or the control unit (as well as additional electronic units of the system) via a bus system.

The method includes two basic steps: an operating phase that takes place after a configuration phase.

In the first phase—the configuration phase—all components or components selected as relevant are configured.

This takes place by an electronic object being provided in an apparatus memory, the electronic object (also designated as an electronic file in the following) being respectively associated one-to-one with a component and including operating data (that embody configuration data) for the respective component. For each component, there is precisely one object or one file. The term "electronic file" is not limiting and generally refers to an object that can be the subject of an access to a component. The object is also designated in the following as an electronic file or DDO and, for example, can be a register or a memory range in a microcontroller. Within the scope of the invention, an object or a DDO is intended to be understood more generally and can also include other access objects (for example an audio file); among other things, it can be retrievable over a network (Internet, for example). It is important that it can be accessed for reading and/or writing from the system. The object is independent of how this is executed in the component.

The electronic file or the content of the electronic file with the operating data (and configuration data) is relayed via the bus system to the respective component for configuration of the component.

In the event that this can be executed without error and/or interruption, the configuration phase is concluded. After this, the apparatus can be placed in operation directly or at a later point in time, namely after the components of the apparatus are configured.

For this, the electronic file is accessed in order to read out the operating data of the respective component. The read-out operating data are thereupon transmitted to the component. After receiving the operating data at the component, said component (and the apparatus as a whole) can be operated with the transmitted operating data.

In the following, the terms used herein are explained in detail.

The operation of the apparatus includes the configuration of the sub-systems or, respectively, components and/or the configuration of the apparatus in advance of the actual operation. For example, numbering among these are settings at individual injectors or settings of the motor to move the patient table. Parameters—for example the travel direction, the travel speed, acceleration parameters etc.—must thereby be set. Furthermore, the start command must be configured ("when and due to what events should the motor be activated?"). The components are typically configured as slaves of a network master (that can be implemented in a control unit). The configuration can also include the detection of a configuration status.

In addition to the configuration, the operation also includes the control of the apparatus, the control of the components, the detection of an operating status (with regard to the complete system and/or with regard to the individual sub-components), the monitoring of the complete system with the individual components, and the testing of the system or, respectively, the components.

The control unit can be implemented in hardware and be formed by a corresponding microcontroller, for example. The microcontroller or, respectively, the control unit can act as a network master. It is engaged in data exchange with the other components of the system via a bus system.

The bus system can in particular be a CAN-based network, for example a CANopen network. In alternative implementations and embodiments of the invention, it can also be a different synchronous or asynchronous bus system. The bus system is advantageously based on a serial transfer (but this is not absolutely necessary for the embodiment of the present invention).

The electronic file or, respectively, the electronic object (which is abbreviated in the following as a DDO) is a digital object that can be the subject of a read and/or write access. The object can be stored in a register of a microcontroller. Furthermore, the object can also be designed, for example, as a defined memory range and be addressable via a corresponding memory address. Alternatively, the electronic file or, respectively, the object can also be an Internet address or a network address (for example within the bus system or within a network system). The network system can be a fashioned as a local network system (LAN, local area network) or as a non-local system (WAN: wide area network).

However, in the complete system an additional electronic file is also provided that is prepared as a configuration file (also called a "pdr"). The configuration file can be stored on a hard disk of the (MR) system and be read upon startup of the system. The configuration file is advantageously designated with the extension "pdr", wherein pdr stands for "periphery data repository". The format of this file is based on xml, and the DDOs and the accesses to these are described in this configuration file (pdr).

The DDO can include different data formats. In addition to text data, audio data or video streams can also be stored here.

A significant aspect of the present invention relates to the fact that what is known as a "single source approach" to the component description is selected. This means that, in principle, all properties (thus parameters that are relevant to the description of the respective component) are stored in only and precisely one file, the electronic file. This electronic file thereby serves as a basis for the configuration and for the operative operation of the complete apparatus. Moreover, the electronic file also includes a description of test cases that can be implemented both in the integration of the component in the complete system and in its operation.

The component is completely described by the electronic file, such that the description can also be used as a basis of a simulation of the component in the complete system (in the medical apparatus).

In an embodiment of the invention, it can also be provided to generate a documentation. The required documentation(s) can be derived simply and in arbitrary data formats from the electronic file.

The electronic file can advantageously also be merged into more complex objects, what are known as Process Data Objects (PDOs). The advantage of these PDOs is apparent in that it is possible to access multiple electronic files and to send and/or receive these (for example) with only a single hardware access. Defined bus protocols that use this form of data transfer in running operation can thereby be used. Ultimately, the PDOs serve to save on hardware accesses (and therefore bus load). The PDOs can include multiple DDOs, and thus multiple data can be transferred in one transfer. However, the PDOs typically do not span across components and thus cannot include DDOs of different components.

The entire communication for configuration and/or operation of the apparatus (also designated as the complete system in the following) takes place via the bus system. A significant advantage of the solution according to the invention is apparent in that, via the electronic file, the component description according to the invention is wholly independent of the type of bus system that is used. It is thus insignificant whether a CANopen bus or another asynchronous protocol is used. Alternatively, it is also possible that individual data exchange steps are processed via another protocol and/or another network.

In a preferred embodiment of the invention, the apparatus memory is associated with the apparatus (thus the complete system). The apparatus memory can thereby be fashioned in the control unit and/or be accessibly by said control unit. The apparatus memory can be fashioned as a hard disk of the apparatus or system (for example of the MR system). Moreover, the apparatus memory can also be connectable as an external instance of the apparatus. However, the apparatus memory is advantageously integrated into the control unit and/or into the apparatus.

The components are advantageously electronic components that can comprise the actuators. The electronic components can comprise sensors and/or actuators. The apparatus memory can also be fashioned to be accessible via the bus system of the control unit.

The operating data can include parameters that unambiguously characterize how the respective component is embedded or integrated into the apparatus. The parameters include parameters about an installation space, parameters with regard to the data exchange of the component with other components and/or apparatus modules, time parameters, identification parameters (version, part number, serial number revision state etc.), as well as other position-related parameters. Most bus systems assign a separate identification/ID (node ID)—for example IP address given the use of the TCP/IP protocol—to the participants on the bus.

Moreover, the parameters can also include additional properties, aspects and/or commands in connection with the respective component (for example via which commands the component can be controlled, which sensors and actuators the component comprises etc.). In other words: the parameters define the "integration" or the "embedding" of the respective component in the complete system (in the sense of an "embedded system").

The operation of the apparatus can include a status display, a loading and/or testing. Moreover, the operating data can include status messages with regard to the components and/or the apparatus, control commands, in only a single electronic file.

According to the invention, the control unit accesses the electronic file for configuration of the component and/or for operation of the apparatus. An advantage is that all relevant parameters and information with regard to the component are stored in only a single electronic file. It is therefore possible to read out all relevant information and data sets with only one hardware access. The time for configuration and/or for startup can thus advantageously be shortened.

According to a further embodiment, in addition to control commands, messages are also provided in connection with the configuration and/or with the operation of the apparatus. The control unit can advantageously provide a message or a plurality of messages for the component (or components), wherein the message is respectively incorporated into the electronic file. Moreover, a link to a memory range can also be incorporated into the data exchange with the component.

Furthermore, it is possible that the control unit generates at least one message from state information of the component that is received from the component. The message can also be a return address (known as a "callback") via which additional instructions and actions can be triggered. For example, here additional evaluations can be activated, error messages can be output or messages can be sent to other instances.

The aforementioned object is also achieved in accordance with the invention by a control unit to control a complex medical apparatus. The complex medical apparatus has a number of components that are to be controlled electronically. The components must be configured for operation of the apparatus. The components are embedded into the medical apparatus. The control unit serves to control the components and/or the apparatus via designed sensors and actuators. The individual units (control unit, the multiple components, the apparatus, the sensors, the actuators) are engaged in data exchanges via a bus system.

The control unit has an apparatus memory, the bus system and an access and transmission unit.

The apparatus memory comprises a process data object (PDO). A process data object can include a plurality of DDOs, wherein a respective DDO is associated with precisely one component. The DDO includes operating data (including configuration data) for configuration of the component and/or for operation of the apparatus. Arbitrarily many electronic files (pdr files) are stored in the apparatus memory (generally on the hard disk of the system or apparatus computer), wherein each file is associated with precisely one component. As described above, the operating data are then stored in the files. The apparatus memory is typically accessible by the control unit and arranged immediately in the control unit. The apparatus memory is preferably arranged in the medical apparatus.

The bus system is a network system, for example a field bus system, and can be a field bus system, an can be an asynchronous, serial bus system and be based on the CAN standard. All units of the control unit and of the apparatus are in communication connection with one another via the bus system. In particular, the components, the medical apparatus and the control unit interact via the bus system.

The access and transmission unit is designed to access the electronic file in order to read out the operating data stored there. The read-out operating data relate to a defined component to which the read-out operating data can then be transmitted one-to-one in order to supply the component with the read-out configuration and/or operating data.

DESCRIPTION OF THE PREFERRED EMBODIMENTS

Figure 1:
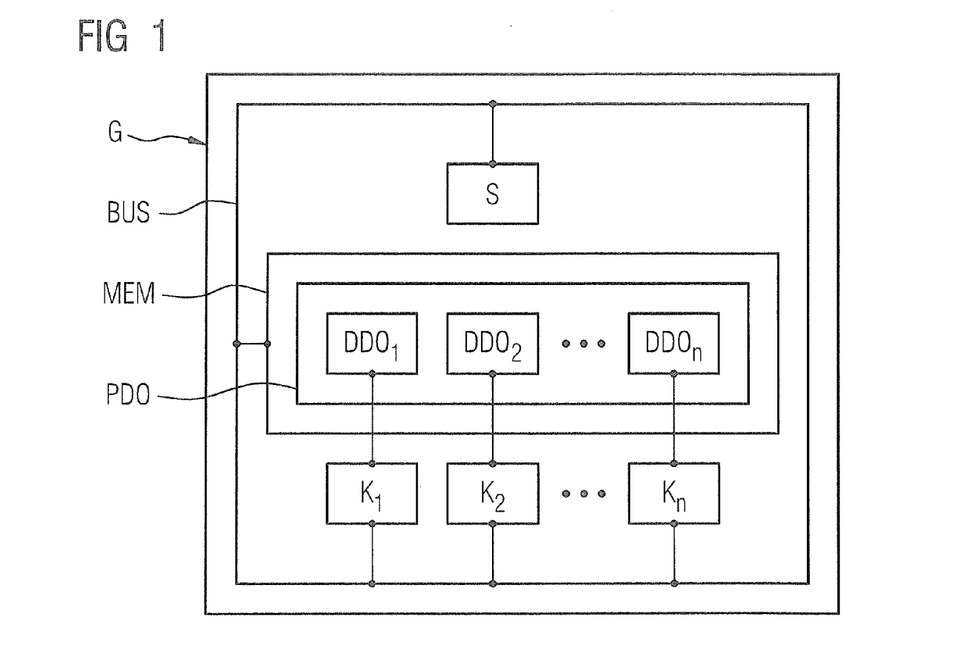
FIG. 1 is an overview representation of a magnetic resonance tomography apparatus according to a preferred embodiment of the invention.

FIG. 1 shows a magnetic resonance tomography apparatus that is operated as a complex, medical apparatus G. In other embodiments, other types of medical systems G can be selected, for example mammography systems, computed tomography, ultrasound apparatuses, PET systems, etc.

The apparatus G can also be designated as a complex system, since a number of electronic components K are embedded or, respectively, integrated into the system. The components K are, for example, a patient bed that must be moved via a motor, or an injector of a biopsy device. The components K are fashioned as an electronic sub-system and interact with one another via a bus system BUS. Beyond this, all units or instances K of the apparatus G are engaged in a data exchange with one another and with the apparatus G (as well as with a control unit S) via the bus system BUS. As shown in FIG. 1, the apparatus G has an apparatus memory MEM. Multiple electronic objects DDO are stored in the apparatus memory MEM (in the following, an "electronic file" is also called a DDO; however, the object DDO does not need to be a file, but rather can also pertain to access objects). According to one aspect, precisely one electronic file DDO is respectively associated with a component K.

For example, the following association thus results:
$DDO_1$-$K_1$
$DDO_2$-$K_2$
. . .
$DDO_n$-$K_n$.

In other words, the number of components K corresponds to the number of electronic files DDO. According to one aspect of the invention, a single source approach is provided that allows that all properties of the respective component K that is necessary for operation in the complete system G are stored in a single electronically readable description DDO in the system G, and can be used as a basis for the configuration and/or the operative operation of the apparatus G. Multiple electronic file scan also be combined into one process data object PDO. A PDO includes the information (data sets or, respectively, signals) of one or more DDOs and is in principle a transport medium in order to reduce the bus loads (less overhead). A PDO cannot be read or written in this sense; rather, it is sent or, respectively, received. It is used in order to exchange information in normal operation.

In FIG. 1, the bus system is represented by the outer border or the connecting lines between the individual units of the apparatus G.

Figure 2:
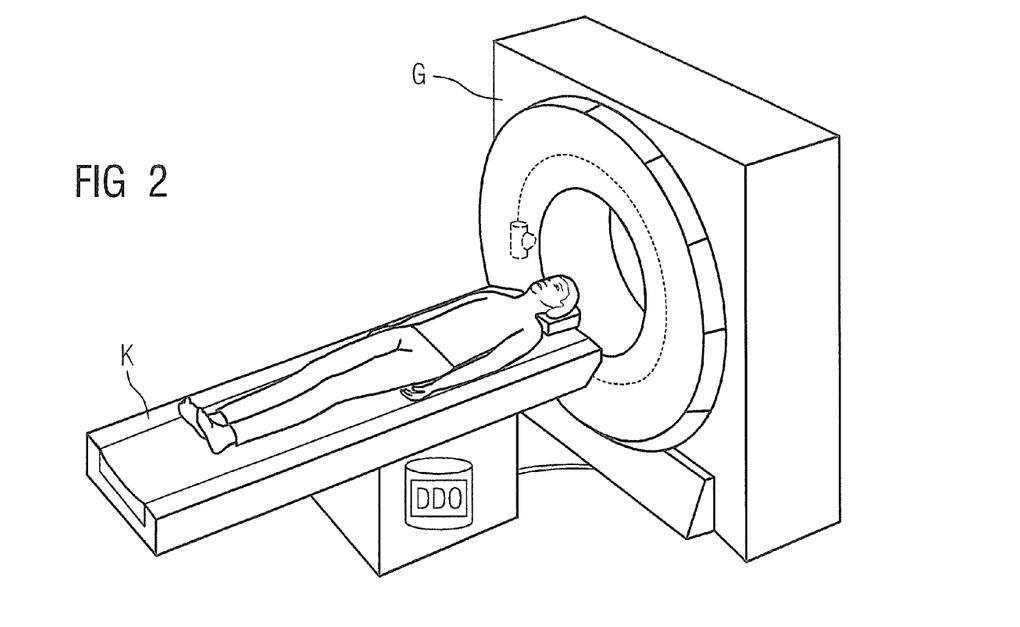
FIG. 2 shows an association between an electronic file and a patient table as components.

As shown in FIG. 2, the patient table (which is represented as a component $K_1$ in FIG. 2 and has a motor for drive control, and moreover an electronic controller) is likewise represented, via the bus system BUS, with the electronic file DDO associated with it. The file DDO includes all data that are necessary for the configuration, the operation, the test and all further applications of the component K.

FIG. 3 again shows multiple instances of electronic files $DDO_1, DDO_2, \ldots, DDO_n$ that interact with the respective components $K_1, K_2, \ldots, K_n$ via the bus system BUS and the central control unit S. In the complete system, the following files or objects are associated with each component K:

a component description B or also pdr file

Figure 3:
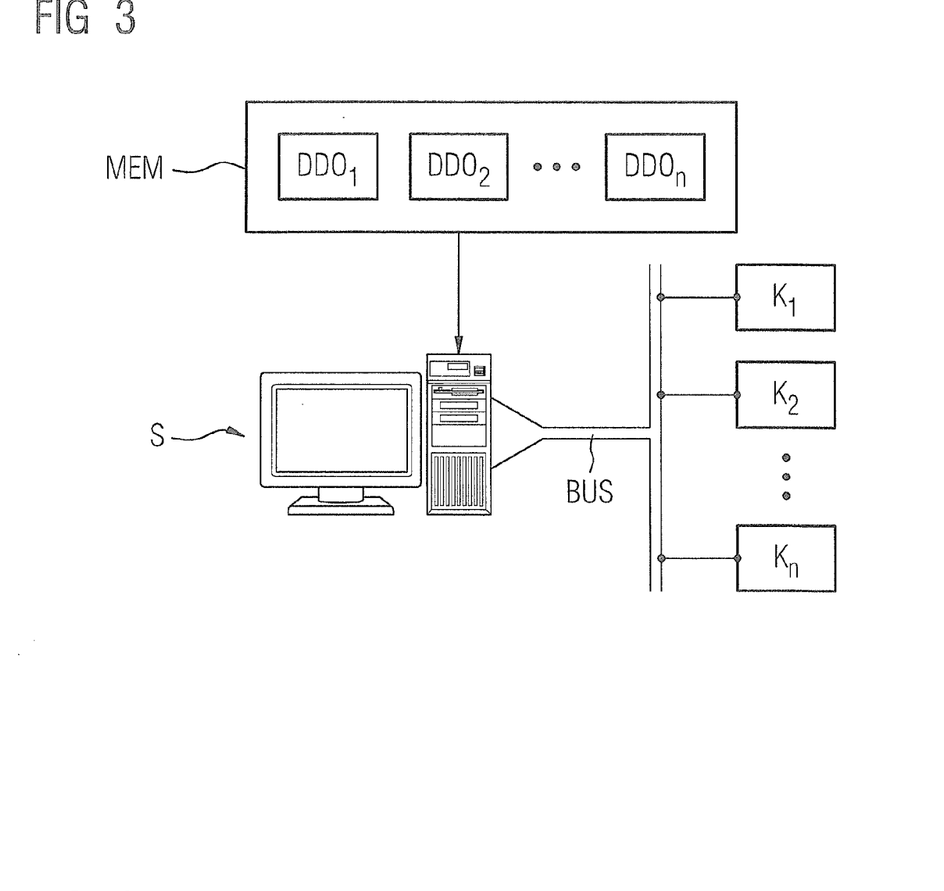
FIG. 3 is a schematic representation of components and electronic files that interact via a control unit.

Optional: a load file L (loadware), loadable software, normally for a microcontroller or an FPGA module. This is always a separate file.

Likewise Optional: message text M. The messages can be included in the component description or exist in a separate file that is in or, respectively, linked with the component description.

Figure 4:
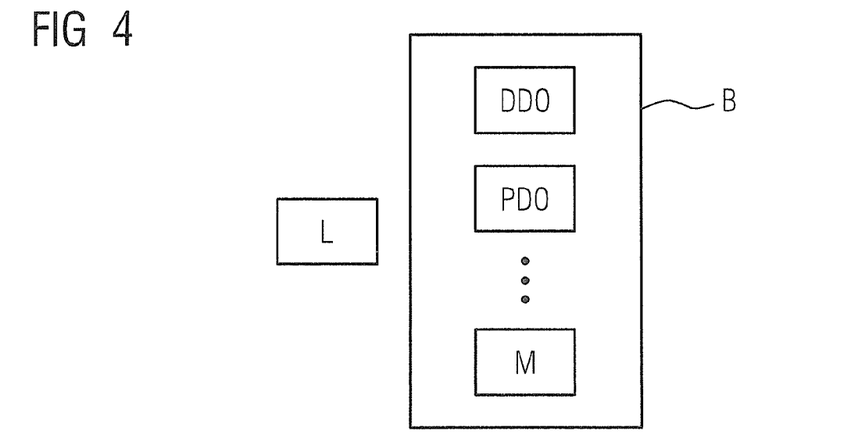
FIG. 4 is a schematic representation of an electronic file according to a preferred embodiment of the invention.

FIG. 4 schematically shows a possible design of a component description B. The component description or pdr file B includes all information regarding the component K, thus also includes the information with regard to the DDOs and PDOs. This file always describes only one component. In this example, the description B also includes the message text M. The loadware L is provided in a separate file. The loadware L and the message texts are typically stored in separate files.

Figure 5:
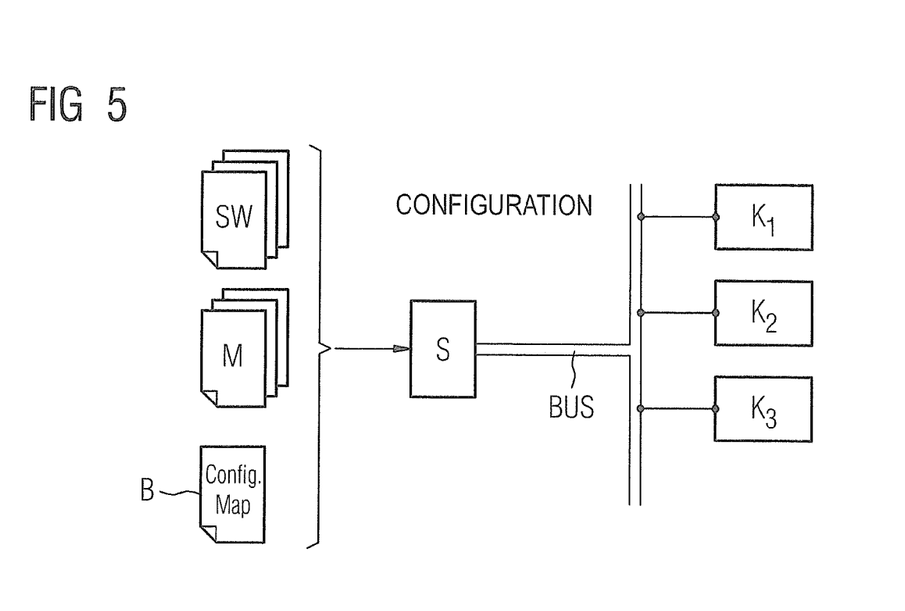
FIG. 5 is a schematic representation of a configuration process according to a preferred embodiment of the invention.

FIG. 5 shows a configuration of the respective component K of the apparatus G. The configuration of the components K is implemented with the use of what is known as a ConfigMap. In the ConfigMap, the DDOs are in a defined order (and with additional timing information) as they are to be sent to the components K, i.e. should be read or written. The apparatus G obtains from the component description B information of which DDOs are to be transferred. The association occurs via addresses, meaning that each component K has a unique address on the bus (for example a node ID), and each DDO also possesses a unique address), such that the data exchange can be operated between the participating communication partners via the bus system BUS.

Loadware L can additionally, optionally be transferred again via the bus system BUS. Message texts can likewise optionally be administered in the apparatus G. If a status update is sent from the component K, in the apparatus G a check is made as to whether a message must be generated. This may then be implemented with the stored message texts.

Figure 6:
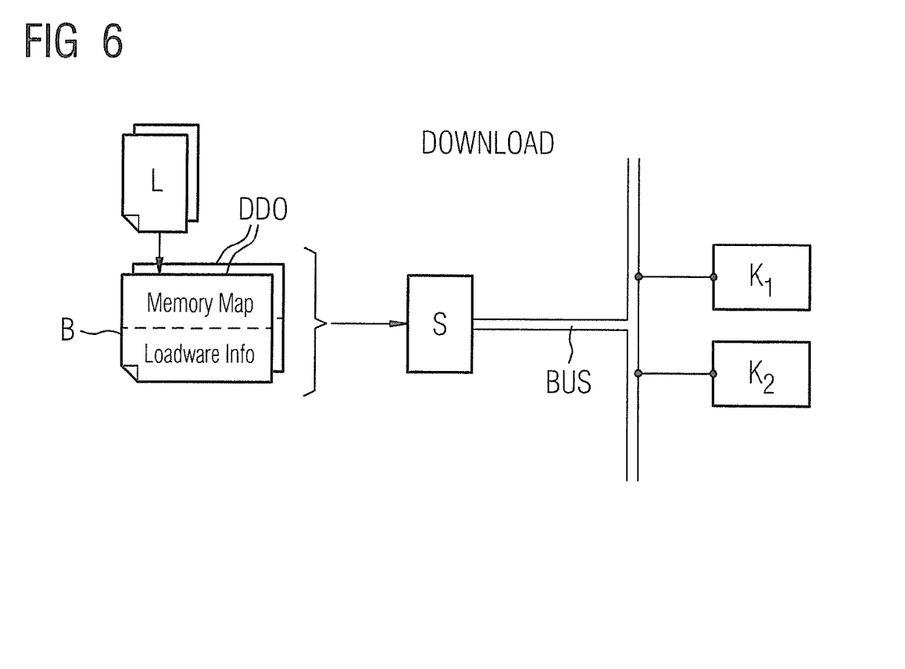
FIG. 6 shows an example representation of a loading process according to a preferred embodiment of the invention.

FIG. 6 likewise schematically shows the download process (that is labeled with the term DOWNLOAD in the Figure) with loadware L. The loadware L is thereby written into a separate file as a MemoryMap. This can be executed in a configuration phase. The download then takes place from the electronic file DDO to the respective components K that are likewise again shown on the right side in FIG. 6.

As indicated on the left side in FIG. 6, in addition to the MemoryMap the component description B also includes a loadware info in the electronic file DDO. With the loadware info, the loadware L is associated with a respective component $K_i$ and can then be loaded. The loadware info thus includes an association information as to which loadware L is to be associated with which component K.

Figure 7:
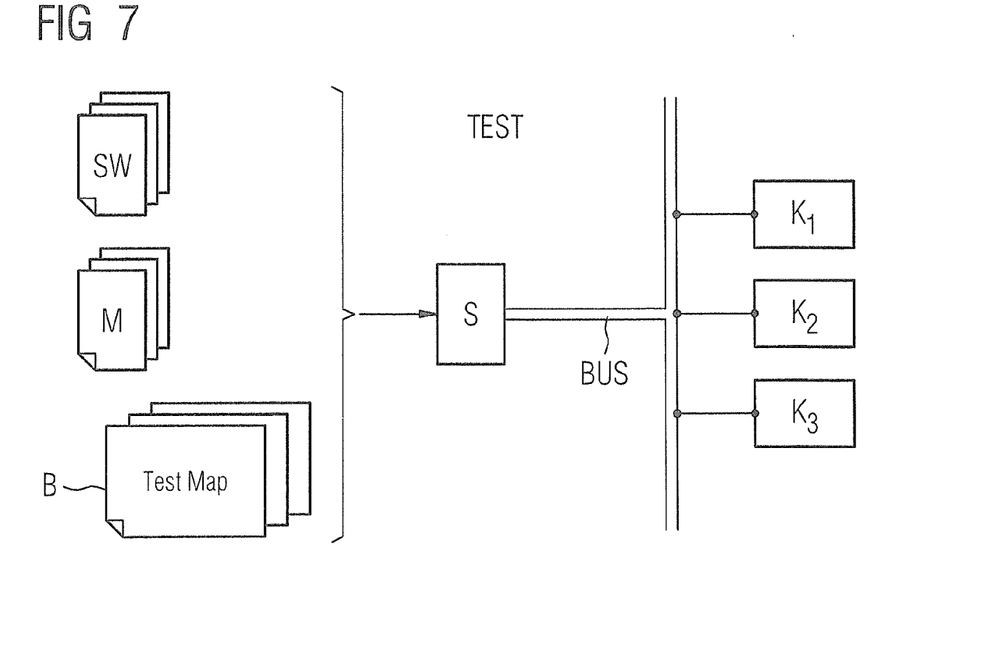
FIG. 7 shows an exemplary and schematic representation of a test process according to a preferred embodiment of the invention.

FIG. 7 likewise schematically shows a test process for the respective component K. For this, a TestMap is provided as a component of the component description B in electronic file DDO. Further component software SW and message texts M that are shown above in FIG. 7 can optionally be provided. The control unit S implements the test process and transfers the respective TestMap to the respective components K to be tested.

Figure 8:
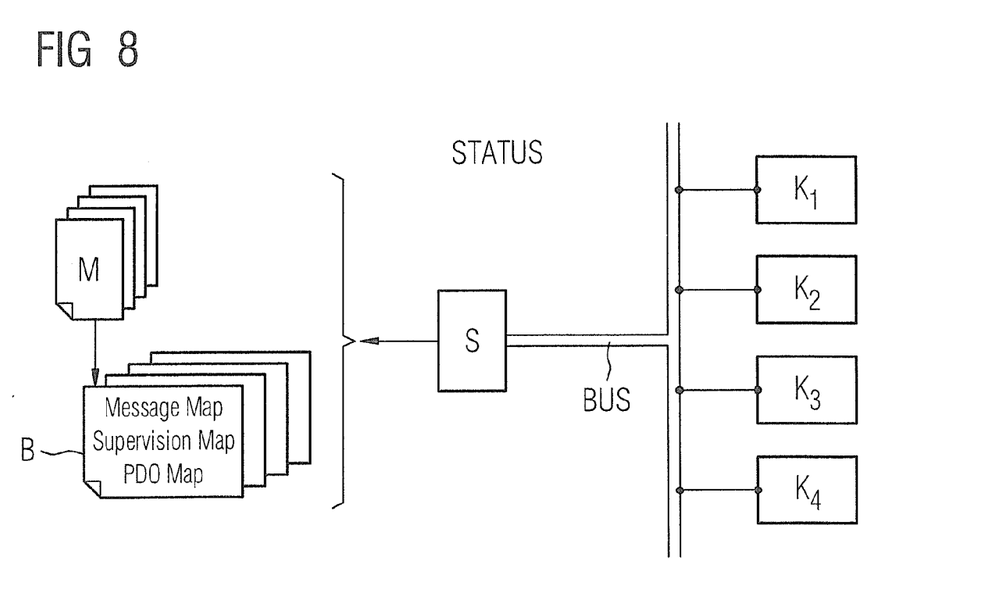
FIG. 8 is an overview representation of a supervision process in accordance with the invention.

FIG. 8 shows the process of a supervision. For this, message texts M that are shown to the upper left in FIG. 8 are loaded into the electronic file DDO as a message, in particular into the component description B. In addition to a MessageMap, the electronic file DDO includes a SupervisionMap and a PDOMap. Via the control unit S, the electronic file DDO is engaged in data exchange with the respective components K that are shown on the right side in FIG. 8. As is likewise schematically indicated in FIG. 8, a component K can send a status information via the control unit S to further instances, which status information is likewise stored in the electronic file DDO. The status information is identified with the reference character "STATUS" in FIG. 8. The received status message is analyzed with the aid of the PDOMap and the SupervisionMap from the component description DDO. Messages are possibly generated automatically and/or additional actions (callbacks, for example) are possibly initiated.

The electronic file DDO (which is respectively associated with a specific component K according to the invention) can be associated with multiple clusters (what are known as MemoryMaps), wherein all electronic files DDO within a MemoryMap possess defined, common properties. For example, all electronic files DDO of a component K that are addressed via the same access protocol can be merged in this way. The electronic files DDO can therefore be written with different access protocols (for example USP interface, CANopen interface etc.) within a component K. However, MemoryMaps can also be used for other purposes, for example as a combination of electronic files, for example for the purposes of documentation. In principle, a documentation or a portion of a documentation can be generated in a simple manner from an electronic file DDO. In principle, an electronic file DDO can be associated with multiple MemoryMaps.

An electronic file DDO advantageously possesses all of or sections of the following attributes:

name; name of the electronic file DDO; the name must be unique within the component K description; description of the respective function of the electronic file DDO MemoryMaps; the MemoryMaps with which the electronic file DDO is associated DataType; data type of the electronic file DDO Group; electronic files DDO can be combined into groups in order to generate complex data types, for example fields/arrays records etc.

Address; the address at which the electronic file DDO is physically addressed

TimeOut; maximum access time at an electronic file DDO

TimeBase; time base for a timeout

ResetValue; initial value of the electronic file DDO after a reset

LimitLow; lower limit of the allowed data range

LimitHigh; upper limit of the allowed data range

ExcessType [sic]; allows access types, in particular write access, read access

Slices; within an electronic file DDO, individual bits or groups of contiguous bits can be identified as a state information with the definition of slices, which bits or groups of bits are associated with the respective messages within the supervision.

MessageMap:

The MessageMap includes the messages that are present for the component K in the apparatus G or, respectively, in the control unit S. That can be realized in different ways. The message texts can be integrated via different links to files that include the messages. Moreover, the message texts can explicitly be included within the electronic file DDO.

A message always includes the following parts:
symbolic name that must be unique to the respective component K
unique error code.

Arbitrarily many text sequences, wherein each text sequence can include additional attributes for presentation (for example presentation as a pop-up window): font size, color etc.

Supervision Map:

The SupervisionMap establishes the connection between relevant state information of the component K, and messages and actions derived or generated from these. The actions can be return addresses, for example, and be designed as callbacks. In principle, each electronic file DDO can include state information that are defined with slices within the definition of the electronic file DDO.

A supervision status can adopt the state "active" or "inactive". Either a message and/or actions (callbacks, for example) can be associated with the state.

In the supervision, the following information must be established for each supervision status for the evaluation of the state information:
name of the supervision status
the associated electronic file DDO; an error code that is sent in the event that the state is active,
the associated slices
initial state of the supervision status
description text of the state in the event of "active"
description text of the state in the event of "inactive"
list of the registered callbacks
definitions of in what way the state bits are to be interpreted.

The check takes place by means of a mask. One evaluation mask is thereby required that establishes which state bits are evaluated, and a result mask is required that checks a priority of the selected state bits.

A check thereupon takes place by means of a range information. A lower range and an upper range are thereby established, as well as what is known as a BorderType. Via the BorderType it is established how the range affiliation of the value is to be interpreted.

A check can likewise be executed by means of a threshold. A threshold and an initialization value are thereby established. Furthermore, additional attributes that affect the evaluation of the state information can be applied, for example an inverted logic.

PDOmap:

In the cases in which multiple electronic files DDO are included within the ProcessData or in the process data object PDO, these must initially be associated with the individual electronic files DDO. For this, the PDOmap includes a list of the supported PDOs with the following entries:
PDO name
list of the included electronic files DDO (with position within the PDO)
protocol-specific attributes (interrupt features etc.)

Hardware Information:

Arbitrary attributes with regard to the component hardware are entered in this range.

Loadware information; arbitrary attributes with regard to loadable components, software (loadware) are entered in this range.

TestMap:

The test cases are defined in this range. The test cases are advantageously configurable in a configuration phase. For this purpose, arbitrarily many lists are established with the required accesses including timing. Both electronic files DDO and process data objects PDO and MemoryMaps can be accessed:
access object (electronic file DDO, process data object PDO, MemoryMap)
access type (read access, write access)
write value or, respectively, expected value
wait time to the next access.

ConfigMap:

The configuration of the component K is defined in this region. For this, arbitrarily many lists are established with the required accesses, including a timing. Both an electronic file DDO and a process data object PDO and MemoryMaps can be accessed:
access object (electronic file DDO, process data object PDO, MemoryMap)
access type (read, write)
write value or, respectively, expected value
wait time to the next access.

A number of advantages are achieved with the present invention. It is possible to derive all relevant information from only one electronic file DDO, which information is required for configuration and for operation of the components K of the apparatus G. Moreover, a documentation of the components K can also be generated. It has furthermore proven to be advantageous that the description is in principle independent of the respectively implemented bus system BUS or on the apparatus type. Moreover, the description B of a component K can be arbitrarily expanded at any time.

The error source can be reduced via the structured description of the component K via the electronic file DDO.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method to operate a complex medical apparatus that comprises a plurality of electronically controlled components that must be configured to operate the apparatus, wherein the components and/or the apparatus are controlled by a control unit and are engaged in data exchange via a bus system, said method comprising:

automatically configuring multiple components among said electronically controlled components, said multiple components being selected from the group consisting of all components and selected components, by providing an electronic object in an apparatus memory, wherein the electronic object is respectively associated with one of said electronically controlled components in said group and includes complete operating data for operating all of the components in said group, and relaying the electronic object with the operating data via the bus system to said one of said electronically controlled components in said group to configure all of the components in said group; and operating the apparatus with the configured components in said group by accessing the electronic object to read out said operating data and transmitting the read-out operating data to said one of said electronically controlled components in said group, and thereby configuring said multiple components in said group, and then operating the apparatus with the transmitted operating data.

2. A method according to claim 1, wherein the electronic object is a register in a microcontroller and/or a memory address and/or a network address.

3. A method according to claim 1, comprising accessing the electronic object by read accesses and/or write accesses.

4. A method according to claim 1, comprising embodying the apparatus memory in the control unit.

5. A method according to claim 1, comprising formulating operating data to include parameters that uniquely identify how each component in said group is embedded in the apparatus, including at least one of parameters about an installation space, data exchange with other components, address, node ID, protocol that is used, and data rate of the access.

6. A method according to claim 1, comprising, from the control unit, accessing the electronic object to configure the component and/or to operate the apparatus.

7. A method according to claim 1, comprising, from the control unit, providing respective messages for the components in said group, wherein each message is respectively integrated into the electronic object and/or is integrated into the data exchange with each component in said group via a link to a memory range.

8. A method according to claim 1, comprising, from state information of said one of said electronically controlled components in said group, that is received from said one of said electronically controlled components in said group, generating, in the control unit, at least one message and/or establishing callback addresses via which additional processes can be initiated.

9. A control unit to control a complex medical apparatus with a plurality of electronically controlled components that must be configured to operate the apparatus, wherein the components and/or the apparatus are controlled by a control unit and are engaged in data exchange via a bus system, said control unit comprising:

an apparatus memory in which an electronic object is stored that comprises complete operating data to configure multiple components among said electronically controlled components, said multiple components being selected from the group consisting of all components and selected components, in order to operate the apparatus, wherein the electronic object is respectively associated with one of said electronically controlled components in said group;

a bus system via which the respective components in said group and the apparatus exchange data; and an access and transfer unit configured to access the electronic object from said memory and to read out the operating data and to transmit the read-out operating data to said one of said electronically controlled components in said group, and thereby to configure said multiple components in said group.

* * * * *